C. H. PLUMMER.
PROCESS OF TEMPORARILY PRESERVING SHELLED PEAS AND SIMILAR VEGETABLES.
APPLICATION FILED JAN. 15, 1913.
1,164,861. Patented Dec. 21, 1915.
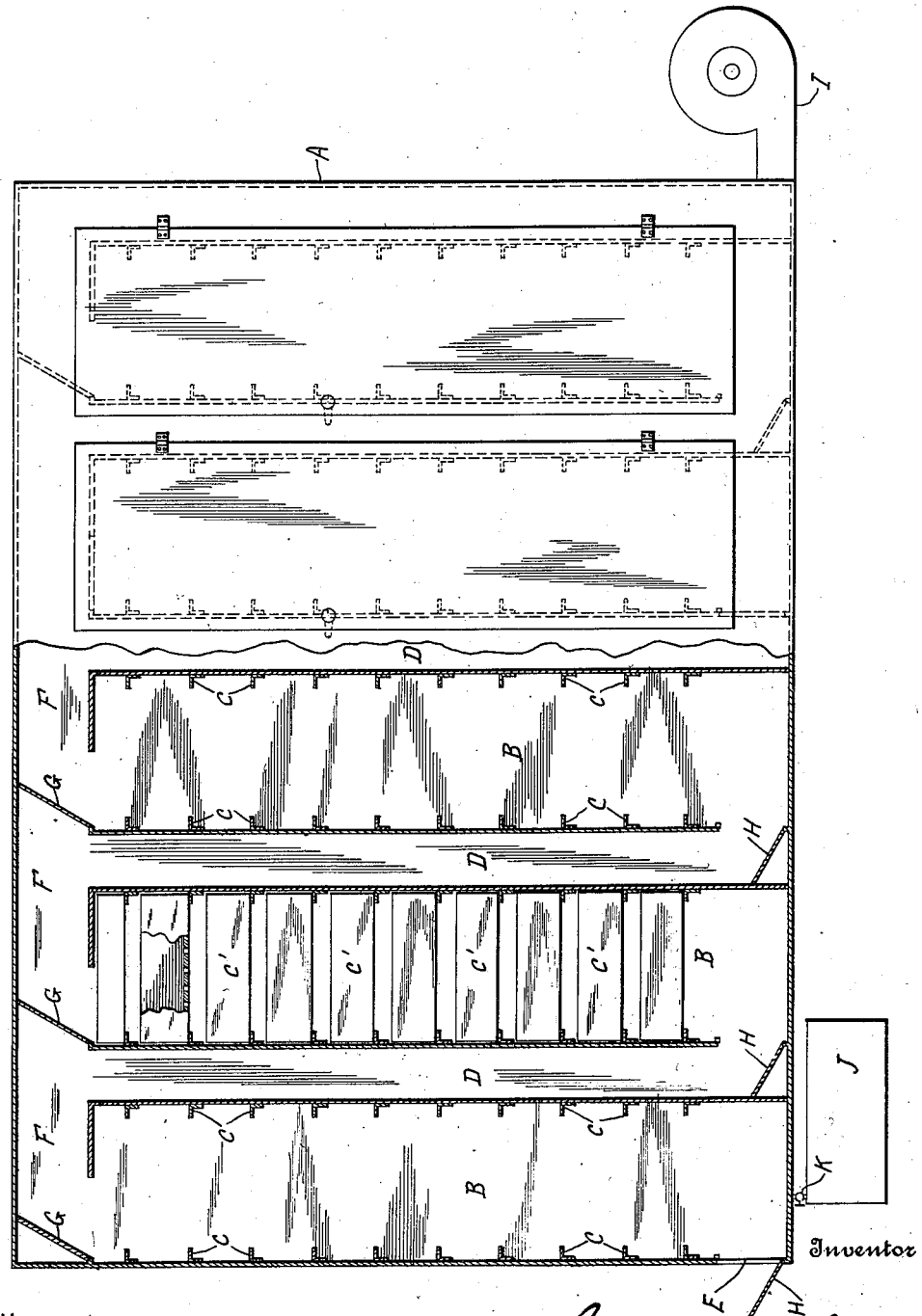

UNITED STATES PATENT OFFICE.

CLARENCE H. PLUMMER, OF KEWAUNEE, WISCONSIN.

PROCESS OF TEMPORARILY PRESERVING SHELLED PEAS AND SIMILAR VEGETABLES.

1,164,861.  Specification of Letters Patent.  Patented Dec. 21, 1915.

Application filed January 15, 1913. Serial No. 742,103.

*To all whom it may concern:*

Be it known that I, CLARENCE H. PLUMMER, a citizen of the United States, residing at Kewaunee, county of Kewaunee, and State of Wisconsin, have invented new and useful Improvements in Processes of Temporarily Preserving Shelled Peas and Similar Vegetables, of which the following is a specification.

My invention relates to improvements in processes of temporarily preserving peas and other vegetables preparatory to canning them.

The harvesting period for canning vegetables is brief and it is frequently not possible under ordinary conditions to sterilize and can the vegetables as fast as they are harvested. In the pea canning industry modern practice requires the use of viners for harvesting and podding the peas in the field, the shelled or podded peas being then conveyed in trays to the canning factory. The delivery of peas to the factory frequently exceeds the capacity of the sterilizing and canning machinery making it necessary to store the peas temporarily or perhaps over night before canning them. Green peas are especially subject to heating or fermentation and rapid deterioration. Peas harvested during an afternoon when the temperature is high will frequently mold before the following morning and will always deteriorate to a considerable extent under the methods heretofore employed which involves storing them in large piles or in boxes whereby considerable pressure is developed at the bottom of the pile.

The object of this invention is to provide means for preserving peas or other vegetables in their original fresh condition until they can be sterilized and canned, and this I am able to accomplish by relieving them from heat and to a large extent from pressure in the interval between the harvesting and canning operation and also by subjecting them to a rapid skin drying operation, which may also in extreme cases involve a cold sterilizing operation as hereinafter set forth.

In the drawing I have illustrated a storage vault in longitudinal vertical section with a view of facilitating the description of my improved process.

In carrying out my improved process the peas are delivered from the viner into trays which have perforated bottoms and are kept in these until they are desired for canning purposes. While in these trays the peas are subjected to a current (preferably an ascending current) of cold air or gas under conditions insuring a distribution of the air or gas throughout the mass of peas in each tray for the purpose of carrying off the heat and skin drying the peas without materially affecting the quantity of moisture within the peas. In order that my process may be carried out on a large scale suitable to the requirements of the canning industry I prepared a vault A having a series of chambers B therein provided with shelves C adapted to receive the trays C'. In the drawing only one of the chambers B is shown filled with trays. The several chambers B are separated by flues D through which the current of air or gas may pass in a downward direction. The trays are formed to fit the walls of the chambers closely so that the air or gas is compelled to pass through the perforated bottoms of the trays and upwardly through the peas. The perforated bottoms are preferably formed so that the total area represented by the perforations is insufficient to permit the air or gas to pass without generating a little pressure which is thus applied through each and all of the perforations upwardly upon the peas. In the construction illustrated in the drawing air, gas or vapor may be admitted through an inlet E to the initial chamber B. After passing upwardly through the trays in this chamber it is delivered to a horizontal upper flue F, a valve G being employed to control the delivery of the air or vapor into this flue. From this flue it may pass downwardly through the initial flue D and enter the bottom of the next chamber B when the operation is repeated. Valves H are preferably employed to control the admission to the bottom portion of each of the chambers B so that by closing the valves H and G with reference to any one of the chambers, the air or vapor may be delivered along the flue F to the next open chamber B, when it will pass downwardly through the flue F which delivers to that chamber and then upwardly through such chamber. The valves G when open, direct the vapor downwardly through the proper flue. When closed these valves permit the vapor to pass along the flue F until obstructed by a raised valve and then downwardly through the proper flue D.

It is not material how the current of gas, air or vapor is developed. Where air is used a suction fan I may be applied to the final flue D or at any other suitable point for directing the air through the vault. Where a sterilizing gas or vapor is employed this may be stored under pressure in a tank J from which it may be delivered to the initial chamber B through a valved connection K. In such case the initial valve H would of course be closed. Carbon dioxid is a very efficient agent for my purpose and when stored under pressure it not only absorbs a large number of heat units during expansion but also serves as an absolute preventative against fermentation. Owing to the fact that the fluid used is delivered upwardly and under a certain pressure as compared with that at the outlet, a slight lifting tendency is exerted upon the peas which prevents them from settling together as heavily as would otherwise be the case, and this also tends to prevent deterioration.

Experiments which I have conducted have demonstrated that while water may be effectively used as a preserving agent, a certain deterioration occurs in the flavor of the peas, but by skin drying the peas as above explained this flavor is preserved. And while I have described my process with particular reference to the temporary preservation of peas it will be understood that the same is applicable to the preservation of other vegetables where the requirements for skin drying preparatory to a canning operation are similar to those involved in canning peas.

It is not necessary that the process above described should be continuous from the time that the peas are stored until they are blanched or cooked. It will ordinarily be sufficient to merely pass a current of air or gas through the peas for a sufficient period to remove the abnormal heat and reduce the temperature to substantially that of the exterior atmosphere during the night or to a point below such temperature. Under some conditions, however, it may be necessary to repeat the process at one or two intervals during the night, or if desired the period of fluid delivery through the peas may be prolonged to suit the conditions, but I believe it will not be desirable to maintain the air or gas current for a sufficient interval to materially dry the interior of the vegetables.

I claim:—

1. The process of temporarily preserving green peas without loss of flavor, consisting in subjecting them to an upwardly flowing stream of a cool gaseous fluid maintained for a sufficient interval to skin dry the peas and reduce their temperature below a point conducive to fermentation, substantially as described.

2. The process of preserving green peas in the interval between harvesting and canning operations, consisting, first, in storing the peas in shallow receptacles, second, subjecting them to an upwardly flowing stream of gaseous fluid for a sufficient interval to skin dry them, and simultaneously sterilizing them.

In testimony whereof I affix my signature in the presence of two witnesses.

CLARENCE H. PLUMMER.

Witnesses:
O. H. BRUEMMER,
LEO W. BRUEMMER.